(12) United States Patent
Davidson et al.

(10) Patent No.: US 7,241,437 B2
(45) Date of Patent: Jul. 10, 2007

(54) ZIRCONIA PARTICLES

(75) Inventors: Robert S. Davidson, Edina, MN (US); Brant U. Kolb, Afton, MN (US); Danny B. Anderson, North St. Paul, MN (US); James A. Higgins, River Falls, WI (US); Mark J. Hendrickson, Minneapolis, MN (US); John T. Brady, Lino Lakes, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 241 days.

(21) Appl. No.: 11/027,426

(22) Filed: Dec. 30, 2004

(65) Prior Publication Data

US 2006/0148950 A1 Jul. 6, 2006

(51) Int. Cl.
C01G 1/00 (2006.01)
C01G 25/00 (2006.01)

(52) U.S. Cl. .......................... 423/608; 423/69; 423/85; 423/593.1

(58) Field of Classification Search ................ 423/608, 423/69, 85, 593.1
See application file for complete search history.

(56) References Cited

U.S. PATENT DOCUMENTS

| | | | |
|---|---|---|---|
| 2,984,628 A | 5/1961 | Alexander et al. | |
| 4,568,445 A | 2/1986 | Cates et al. | |
| 4,619,817 A | 10/1986 | Stambaugh et al. | |
| 4,721,377 A | 1/1988 | Fukuda et al. | |
| 4,784,794 A | 11/1988 | Kato | |
| 4,812,032 A | 3/1989 | Fukuda et al. | |
| 4,845,056 A | 7/1989 | Yamanis | |
| 5,037,579 A | 8/1991 | Matchett | |
| 5,047,174 A * | 9/1991 | Sherif ......................... | 516/33 |
| 5,175,030 A | 12/1992 | Lu et al. | |
| 5,183,597 A | 2/1993 | Lu | |
| 5,223,176 A * | 6/1993 | Obitsu et al. ................. | 516/90 |
| 5,234,870 A * | 8/1993 | Osaka et al. .................. | 501/12 |
| 5,424,339 A | 6/1995 | Zanka et al. | |
| 5,453,262 A | 9/1995 | Dawson et al. | |
| 5,486,949 A | 1/1996 | Schrenk et al. | |
| 5,652,192 A | 7/1997 | Matson et al. | |
| 5,698,483 A | 12/1997 | Ong et al. | |
| 5,783,120 A | 7/1998 | Ouderkirk et al. | |
| 5,825,543 A | 10/1998 | Ouderkirk et al. | |
| 5,828,488 A | 10/1998 | Ouderkirk et al. | |
| 5,882,774 A | 3/1999 | Jonza et al. | |
| 5,908,874 A | 6/1999 | Fong et al. | |
| 5,917,664 A | 6/1999 | O'Neill et al. | |
| 5,919,551 A | 7/1999 | Cobb, Jr. et al. | |
| 5,932,626 A | 8/1999 | Fong et al. | |
| 5,935,275 A | 8/1999 | Burgard et al. | |
| 6,107,364 A | 8/2000 | Fong et al. | |
| 6,111,696 A | 8/2000 | Allen et al. | |
| 6,280,063 B1 | 8/2001 | Fong et al. | |
| 6,329,058 B1 | 12/2001 | Arney et al. | |
| 6,355,754 B1 | 3/2002 | Olson et al. | |
| 6,356,391 B1 | 3/2002 | Gardiner et al. | |
| 6,376,590 B2 | 4/2002 | Kolb et al. | |
| 6,387,981 B1 | 5/2002 | Zhang et al. | |
| 6,541,591 B2 | 4/2003 | Olson et al. | |
| 6,663,978 B1 | 12/2003 | Olson et al. | |
| 6,833,176 B2 | 12/2004 | Chisholm et al. | |
| 6,833,391 B1 | 12/2004 | Chisholm et al. | |
| 6,844,950 B2 | 1/2005 | Ja Chisholm et al. | |
| 6,984,935 B2 | 1/2006 | Chiu et al. | |
| 7,045,558 B2 | 5/2006 | Chisholm et al. | |
| 7,046,439 B2 | 5/2006 | Kaminsky et al. | |
| 7,087,659 B2 | 8/2006 | Chisholm et al. | |
| 2002/0004544 A1 | 1/2002 | Kolb et al. | |
| 2002/0156162 A1 | 10/2002 | Stadler | |
| 2003/0086865 A1 | 5/2003 | Sabacky et al. | |
| 2003/0113254 A1 | 6/2003 | Belov et al. | |
| 2003/0165680 A1 | 9/2003 | Brady et al. | |
| 2004/0192790 A1 | 9/2004 | Chiang et al. | |
| 2005/0029942 A1 | 2/2005 | Chiu et al. | |
| 2005/0059766 A1 | 3/2005 | Jones et al. | |
| 2005/0147838 A1 | 7/2005 | Olson et al. | |
| 2005/0148735 A1 | 7/2005 | Olson et al. | |
| 2005/0151119 A1 | 7/2005 | Jones et al. | |
| 2006/0055918 A1 | 3/2006 | Groess et al. | |

(Continued)

FOREIGN PATENT DOCUMENTS

EP 0 337 472 A 10/1989

(Continued)

OTHER PUBLICATIONS

Adschiri et al., "Rapid and Continuous Hydrothermal Crystallization of Metal Oxide Particles in Supercritical Water" J. Am. Ceram. Soc. vol. 75, pp. 1019-1022, 1992.

Cabanas et al. "Continuous Hydrothermal Synthesis of Inorganic Materials in a Near-Critical Water Flow Reactor; the one-step synthesis of Nano-Particulate $Ce_{1-x}Zr_xO_2(x=0-1)$ Solid Soluitons" J. Mater. Chem. vol. 11, pp. 561-568, 2001.

Cabanas et al., "A Continuous and Clean One-Step Synthesis Of Nano-Particulate $Ce_{1-x}Zr_xO_2$ Solid Solutions in Near-Critical Water", Chem. Commun. pp. 901-902, 2000.

(Continued)

*Primary Examiner*—Timothy C. Vanoy
(74) *Attorney, Agent, or Firm*—Jean A. Lown

(57) ABSTRACT

Zirconia particles, methods of making zirconia particles, composite materials that contain the zirconia particles, methods of making the composite materials, and zirconia sols that contain the zirconia particles are described. The zirconia particles are substantially non-associated and have an average size no greater than 50 nanometers and may contain yttrium. The zirconia particles are prepared by a method that includes two separate hydrothermal treatments.

18 Claims, 1 Drawing Sheet

U.S. PATENT DOCUMENTS

| | | |
|---|---|---|
| 2006/0017702 A1 | 7/2006 | Pokorny et al. |
| 2006/0148950 A1 | 7/2006 | Davidson et al. |

FOREIGN PATENT DOCUMENTS

| | | |
|---|---|---|
| EP | 1 014 113 A2 | 6/2000 |
| EP | 1 510 557 A2 | 3/2005 |
| JP | 59-107969 | 6/1984 |
| JP | 60-176920 | 9/1985 |
| JP | 59-107969 | 7/1991 |
| WO | WO 94-01361 | 1/1994 |
| WO | WO 97/10527 | 3/1997 |
| WO | WO 02/20396 | 3/2002 |
| WO | WO 02/42201 | 5/2002 |
| WO | WO 03/076528 A2 | 9/2003 |
| WO | WO2004/078652 | 9/2004 |

OTHER PUBLICATIONS

Dawson, "Hydrothermal Synthesis of Advanced Cermaic Powders", Ceramic Bulletin, vol. 67, No. 10, pp. 1673-1678, 1988.

Li et al., "X-ray Absorption Studies of Zirconia Polymorphs, I. Characteristic Local Structures" Physical Review B, vol. 48, No. 14, pp. 10 063-10 073, 1993.

U.S. Application entitled "Polymerizable Composition Comprising Low Molecular Weight Organic Component", filed on Mar. 11, 2005, having U.S. Appl. No. 11/077,598.

U.S. Application entitled "Polymerizable Compositions Comprising Nanoparticles", filed on Jun. 17, 2004, having U.S. Appl. No. 10/870,366.

Finsy et al., "Particle Sizing by Photon Correlation Spectroscopy", *Particle and Particle Systems Characterization*, 1991, vol. 8, pp. 187-193.

Stakkestad et al., "Surface Chemistry of Lanthanum Chromite I. Multivate Data Modeling of Brunauer-Emmett-Teller Surface Area by the use of Particle Size Distribution Data from Photon-Correlation Spectroscopy Measurements", *Colloid Polym. Sci.*, 1999, vol. 277, pp. 174-183.

* cited by examiner

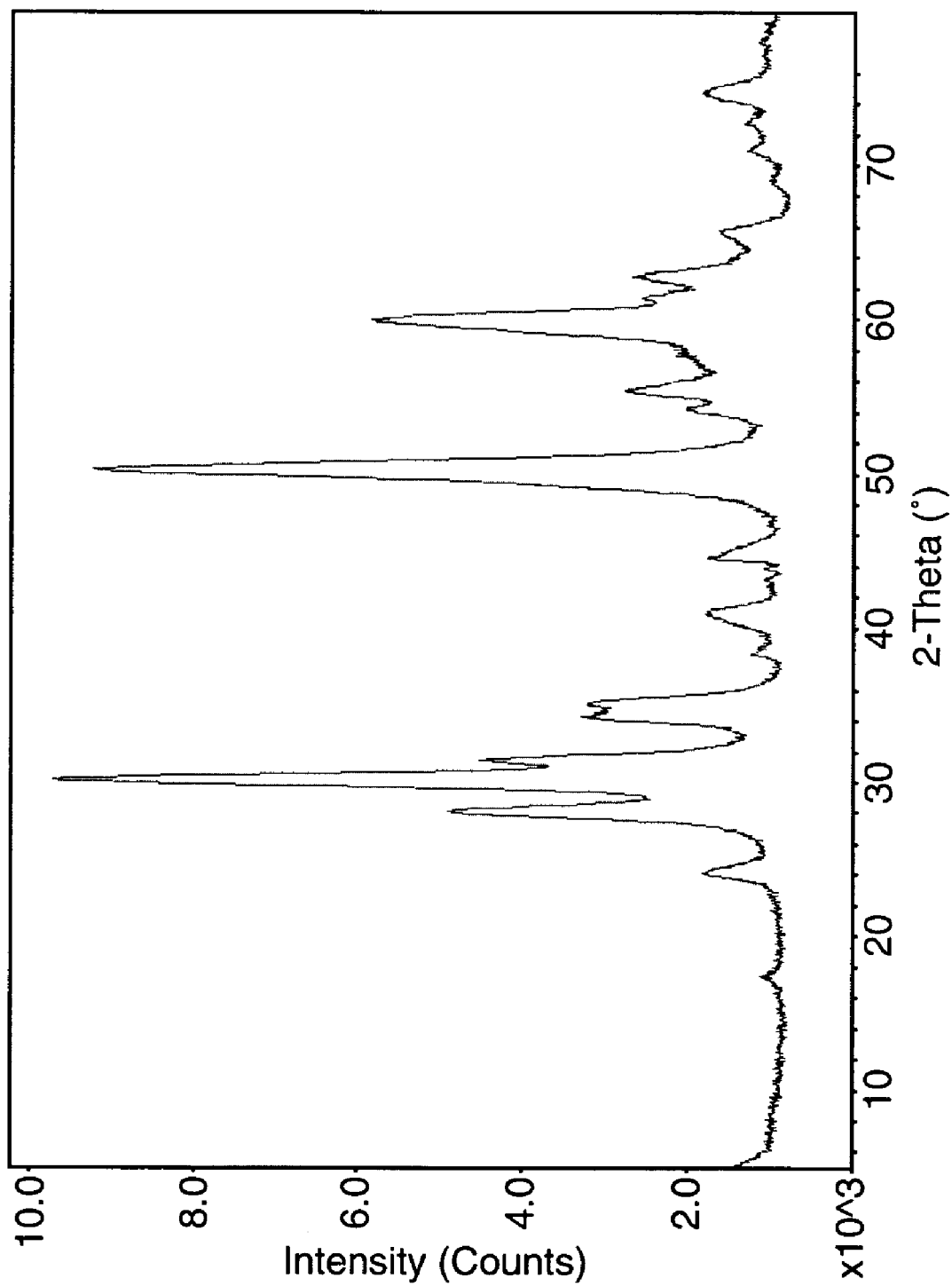

ZIRCONIA PARTICLES

TECHNICAL FIELD

This invention relates to zirconia particles, methods of making zirconia particles, zirconia sols that contain zirconia particles, composite materials that contain zirconia particles, and methods of making composite materials.

BACKGROUND

Zirconia particles can be added to an organic matrix to increase the index of refraction or x-ray opacity of the organic matrix while retaining the optical transmission of the organic matrix. The extent to which the x-ray opacity and/or refractive index of the organic matrix can be increased is dependent on the percent loading of zirconia in the organic matrix and on characteristics of the zirconia particles such as the percent crystallinity, the crystalline structure, the primary particle size, and the degree of association between the primary particles.

Crystalline zirconia usually has a higher refractive index and a greater x-ray scattering capability than amorphous zirconium-containing materials. The optical transmission is often a function of the size of the zirconia particles. As the primary particle size increases and/or the degree of association between primary particles increases, the optical transmission is reduced. The percent loading limit of zirconia particles in an organic matrix material is usually a function of both the extent of particle association and the particle aspect ratio. As the extent of particle association increases, the percent loading limit of the zirconia particles in an organic matrix tends to decrease. Similarly, as the aspect ratio of the zirconia particles increases, the percent loading limit of the zirconia particles in an organic matrix tends to decrease.

SUMMARY

The present invention provides zirconia particles and methods of making zirconia particles. The zirconia particles are colloidal (e.g., less than 100 nanometers), crystalline, and substantially non-associated. The zirconia particles can be added to an organic matrix material to provide, for example, transparent or translucent composite materials having a high index of refraction, a high x-ray opacity, or a combination thereof.

In one aspect, a method of making zirconia particles is provided. The method includes preparing a first feedstock that contains a zirconium salt and subjecting the first feedstock to a first hydrothermal treatment to form a zirconium-containing intermediate and a byproduct. The method further includes forming a second feedstock by removing at least a portion of the byproduct of the first hydrothermal treatment and subjecting the second feedstock to a second hydrothermal treatment to form a zirconia sol that contains the zirconia particles.

In another aspect, zirconia particles are provided that contain yttrium in an amount of 0.1 to 8 weight percent based on the weight of the inorganic oxides in the zirconia particles. The zirconia particles have an average primary particle size no greater than 50 nanometers, a dispersion index of 1 to 3, a ratio of intensity-average particle size to volume-average particle size no greater than 3.0, and a crystal structure that is at least 70 percent cubic, tetragonal, or a combination thereof.

In another aspect, a zirconia sol is provided that contains zirconia particles dispersed in an aqueous medium that includes a carboxylic acid. The carboxylic acid contains no greater than four carbon atoms and is substantially free of a polyether carboxylic acid. The zirconia particles have an average primary particle size no greater than 50 nanometers, a dispersion index of 1 to 5, a ratio of intensity-average particle size to volume-average particle size no greater than 3.0, and a crystal structure that is at least 50 percent cubic, tetragonal, or a combination thereof. In some embodiments of the zirconia sol, the zirconia particles contain 0.1 to 8 weight percent yttrium based on the weight of the inorganic oxides in the zirconia particles and have a crystal structure that is at least 70 percent cubic, tetragonal, or a combination thereof. Such zirconia particles often have a dispersion index of 1 to 3.

In yet another aspect, a composite material is provided that includes zirconia particles dispersed in an organic matrix. The zirconia particles contain yttrium in an amount of 0.1 to 8 weight percent based on the weight of the inorganic oxides in the particles. The zirconia particles have an average primary particle size no greater than 50 nanometers, a dispersion index of 1 to 3, a ratio of intensity-average particle size to volume-average particle size no greater than 3.0, and a crystal structure that is at least 70 percent cubic, tetragonal, or a combination thereof.

Additionally, methods of making a composite material are provided. A first method includes forming a zirconia sol, adding an organic matrix material, and removing at least a portion of a liquid phase from the zirconia sol. The zirconia sol is formed by preparing a first feedstock that contains a zirconium salt, subjecting the first feedstock to a first hydrothermal treatment to form a zirconium-containing intermediate and a byproduct, forming a second feedstock by removing at least a portion of the byproduct of the first hydrothermal treatment, and subjecting the second feedstock to a second hydrothermal treatment.

A second method of making a composite material includes providing a zirconia sol that contains zirconia particles dispersed in an aqueous medium, adding an organic matrix material, and removing at least a portion of the aqueous medium from the zirconia sol. The aqueous medium of the zirconia sol includes a carboxylic acid that contains no greater than four carbon atoms and that is substantially free of a polyether carboxylic acid. The zirconia particles have an average primary particle size no greater than 50 nanometers, a dispersion index of 1 to 5, a ratio of intensity-average particle size to volume-average particle size no greater than 3.0, and a crystal structure that is at least 50 percent cubic, tetragonal, or a combination thereof. In some embodiments of the zirconia sol, the zirconia particles contain 0.1 to 8 weight percent yttrium based on the weight of the inorganic oxides in the zirconia particles and have a crystal structure that is at least 70 percent cubic, tetragonal, or a combination thereof.

The above summary of the present invention is not intended to describe each disclosed embodiment or every implementation of the present invention. The Figure, Detailed Description and Examples that follow more particularly exemplify these embodiments.

BRIEF DESCRIPTION OF THE DRAWINGS

FIG. 1 is a representative x-ray diffraction pattern for exemplary zirconia particles.

DETAILED DESCRIPTION

Zirconia particles, methods of making zirconia particles, zirconia sols that contain zirconia particles, composite materials that contain zirconia particles, and methods of making composite materials are described. The zirconia particles are prepared using a process that involves two separate hydrothermal treatments.

Definitions

As used herein, the terms "a", "an", and "the" are used interchangeably with "at least one" to mean one or more of the elements being described.

As used herein, the term "associated" refers to a grouping of two or more primary particles that are aggregated and/or agglomerated. Similarly, the term "non-associated" refers to groupings of two or more primary particles that are free from aggregation and/or agglomeration.

As used herein, the term "aggregation" refers to a strong association between primary particles. For example, the primary particles may be chemically bound to one another. The breakdown of aggregates into smaller particles (e.g., primary particles) is generally difficult to achieve.

As used herein, the term "agglomeration" refers to a weak association of primary particles. For example, the primary particles may be held together by charge or polarity. The breakdown of agglomerates into smaller particles (e.g., primary particles) is less difficult than the breakdown of aggregates into smaller particles.

As used herein, the term "hydrodynamic particle size" refers to the volume-average particle size of the zirconia particles in a liquid phase as measured by Photon Correlation Spectroscopy (PCS) using the method described herein.

As used herein, the term "hydrothermal" refers to a method of heating an aqueous medium, in a closed vessel, to a temperature above the normal boiling point of the aqueous medium at a pressure that is equal to or greater than the pressure required to prevent boiling of the aqueous medium.

As used herein, the term "primary particle size" refers to the size of a non-associated single crystal zirconia particle. X-ray Diffraction (XRD) is typically used to measure the primary particle size using the method described herein.

As used herein, the term "sol" refers to a dispersion or suspension of colloidal particles in a liquid phase (e.g., aqueous medium). The particles in the sol are typically not agglomerated or aggregated.

As used herein, the term "zirconia" refers to various stoichiometries for zirconium oxides, most typically $ZrO_2$, and may also be known as zirconium oxide or zirconium dioxide. The zirconia may contain up to 30 weight percent of other chemical moieties such as, for example, $Y_2O_3$ and organic material.

Method of Making Zirconia Particles

The zirconia particles can be prepared using hydrothermal technology. More specifically, a first feedstock that contains a zirconium salt is subjected to a first hydrothermal treatment to form a zirconium-containing intermediate and a byproduct. A second feedstock is prepared by removing at least a portion of the byproduct formed during the first hydrothermal treatment. The second feedstock is then subjected to a second hydrothermal treatment to form a zirconia sol that contains the zirconia particles.

The first feedstock is prepared by forming an aqueous precursor solution that contains a zirconium salt. The anion of the zirconium salt is usually chosen so that it can be removed during subsequent steps in the process for preparing the zirconia sol. Additionally, the anion is often chosen to be non-corrosive, allowing greater flexibility in the type of material chosen for the processing equipment such as the hydrothermal reactors.

The anion of the zirconium salt is usually a carboxylate. At least 50 mole percent of the carboxylate anions have no greater than four carbon atoms. For example, in some precursor solutions, at least 60 mole percent, at least 70 mole percent, at least 80 mole percent, at last 90 mole percent, at least 95 mole percent, at least 98 mole percent, or at least 99 mole percent of the carboxylate anions have no greater than four carbon atoms.

Suitable carboxylates having no greater than four carbon atoms include formate, acetate, propionate, butyrate, or a combination thereof. These carboxylate anions can often be removed during the process by conversion to the corresponding volatile acid. Further, these carboxylate anions are often more compatible with an organic matrix material compared to other anions such as chlorides or nitrates.

In some precursor solutions, the anion is a mixture of a carboxylate having no greater than four carbon atoms and a polyether carboxylate anion. Suitable polyether carboxylate anions are the corresponding weak bases of water-soluble monocarboxylic acids (i.e., one carboxylic acid group per molecule) having a polyether tail: The polyether tail contains repeating difunctional ether radicals having the general formula —O—R— where R is an alkylene group such as, for example, methylene, ethylene and propylene (including n-propylene and iso-propylene) or a combination thereof. Suitable polyether carboxylates have more than four carbon atoms and include, but are not limited to, those formed from polyether carboxylic acids such as 2-[2-(2-methoxyethoxy) ethoxy]acetic acid (MEEAA) and 2-(2-methoxyethoxy)acetic acid (MEAA). The polyether carboxylate, if included in the precursor solution, is typically present in an amount no greater than 50 mole percent based on the moles of carboxylate anions in the precursor solution. For example, the amount of polyether carboxylate can be no greater than 40 mole percent, no greater than 30 mole percent, no greater than 20 mole percent, no greater than 10 mole percent, no greater than 5 mole percent, no greater than 2 mole percent, or no greater than 1 mole percent of the carboxylate anions in the precursor solution.

Some precursor solutions are substantially free of polyether carboxylates, substantially free of carboxylates that have more than four carbon atoms, or a combination thereof. As used herein, the term "substantially free of polyether carboxylates" means that less than 1 mole percent of the carboxylate in the precursor solution are polyether carboxylates or the corresponding polyether carboxylic acid. For example, less than 0.5 mole percent, less than 0.2 mole percent, or less than 0.1 mole percent of the carboxylates in the precursor solution are polyether carboxylates or the corresponding polyether carboxylic acid. As used herein, the term "substantially free of carboxylates that have more than four carbon atoms" means that less than 1 mole percent of the carboxylates or the corresponding carboxylic acids in the precursor solution have greater than four carbon atoms. For example, less than 0.5 mole percent, less than 0.2 mole percent, or less than 0.1 mole percent of the carboxylates or corresponding carboxylic acids have greater than four carbon atoms.

Some precursor solutions are substantially free of halides such as chlorides. As used herein, the term "substantially free of halides" means that the precursor solution has less than $10^{-2}$ moles/liter, less than $10^{-3}$ moles/liter, less than $10^{-4}$ moles/liter, or less than $10^{-5}$ moles/liter halide.

The zirconium salt is often zirconium acetate. Zirconium acetate can be represented by a formula such as $ZrO_{((4-n)/2)}^{n+}(CH_3COO^-)_n$ where n is in the range of 1 to 2. The zirconium ion may be present in a variety of structures depending, for example, on the pH of the precursor solution. Methods of making zirconium acetate are described, for example, in W. B. Blumenthal, "The Chemical Behavior of Zirconium," pp. 311–338, D. Van Nostrand Company, Princeton, N.J. (1958). Suitable aqueous solutions of zirconium acetate are commercially available, for example, from Magnesium Elektron, Inc. (Flemington, N.J.) that contain up to 17 weight percent zirconium, up to 18 weight percent zirconium, up to 20 weight percent zirconium, or up to 22 weight percent zirconium.

Some precursor solutions contain an yttrium salt in addition to a zirconium salt. As with the zirconium salt, the anion of the yttrium salt is typically chosen to be removable during subsequent processing steps and to be non-corrosive. The anion of the yttrium salt is often a carboxylate having no more than four carbon atoms. For example, the anion can be acetate. The yttrium salt is often present in an amount up to 0.12 grams yttrium per gram of zirconium, up to 0.10 grams yttrium per gram of zirconium, up to 0.08 grams yttrium per gram of zirconium, up to 0.06 grams yttrium per gram of zirconium, or up to 0.04 grams yttrium per gram of zirconium.

The liquid phase of the precursor solution is typically predominately water. However, other miscible co-solvents can be included in the liquid phase in amounts up 20 weight percent based on the weight of the liquid phase. Suitable co-solvents include, but are not limited to, 1-methoxy-2-propanol, ethanol, isopropanol, ethylene glycol, N,N-dimethylacetamide, and N-methyl pyrrolidone.

In some embodiments, the first feedstock is prepared by forming an aqueous precursor solution that includes a zirconium salt and an optional yttrium salt and then removing at least a portion of the anions in the precursor solution. Any suitable method known in the art for removing a portion of the anions can be used. Removal methods include, but are not limited to, vaporization, dialysis, ion exchange, precipitation, filtration, and the like. In some removal methods, the anion is removed as an acid. Although not wanting to be bound be theory, the partial removal of the anion in the precursor solution may reduce the formation of agglomerates and aggregates during one or more of the subsequent hydrothermal treatment steps.

In one method of at least partially removing the anions in the precursor solution, the precursor solution can be heated to vaporize an acidic form of the anion. For example, a carboxylate anion having no more than four carbon atoms can be removed as the corresponding carboxylic acid. More specifically, an acetate anion can be removed as acetic acid. The heating also can at least partially remove the liquid phase (e.g., aqueous medium) of the precursor solution in addition to the carboxylic acid. The partial removal of the liquid phase results in the formation of a concentrated precursor. In some methods, the solids can be increased up to 25 weight percent, up to 50 weight percent, up to 75 weight percent, or up to 100 weight percent. The concentrated precursor often contains at least 10 weight percent zirconium, at least 15 weight percent zirconium, at least 20 weight percent zirconium, at least 25 weight percent zirconium, at least 30 weight percent zirconium, at least 35 weight percent zirconium, or at least 40 weight percent zirconium. For example, the concentrated precursor can contain 11 to 43 weight percent zirconium or 21 to 43 weight percent zirconium.

All or a portion of the liquid phase removed to form the concentrated precursor can be replaced prior to the first hydrothermal treatment. The concentrated precursor can be diluted with water (e.g., deionized water) to provide the first feedstock. The first feedstock can have a solid content that is lower than the solid content of the precursor solution, equal to the solid content of the precursor solution, or greater than the solid content of the precursor solution.

The first feedstock typically has solids in the range of 0.5 to 20 weight percent or 2 to 15 weight percent. The first feedstock often contains at least 0.2 weight percent zirconium, at least 0.5 weight percent zirconium, at least 1 weight percent zirconium, or at least 2 weight percent zirconium. In some embodiments, the first feedstock contains up to 6 weight percent zirconium, up to 8 weight percent zirconium, or up to 9 weight percent zirconium. For example, the first feedstock often contains 0.2 to 9 weight percent zirconium or 1 to 6 weight percent zirconium.

The pH of the first feedstock is typically in the acidic range. For example, the pH is usually less than 6, less than 5, less than 4, or less than 3.

The first feedstock is subjected to a first hydrothermal treatment. The zirconium species in the first feedstock undergoes partial hydrolysis to form a zirconium-containing intermediate and a byproduct. Likewise, any optional yttrium salt present in the first feedstock can undergo partial hydrolysis. The hydrolysis reaction is often accompanied by the release of an acidic byproduct when the anion is a carboxylate. For example, if the anion is formate, acetate, propionate, or butyrate, the corresponding acid (i.e., formic acid, acetic acid, propionic acid, or butyric acid respectively) can be released during the hydrolysis reaction.

The hydrothermal treatments can be in a batch reactor or a continuous reactor. The residence times are typically shorter and the temperatures are typically higher in a continuous reactor compared to a batch reactor. The time of the hydrothermal treatments can be varied depending on the temperature of the reactor and the concentration of the feedstock. The pressure in the reactor can be autogeneous (i.e., the vapor pressure of water at the temperature of the reactor), can be hydraulic (i.e., the pressure caused by the pumping of a fluid against a restriction), or can result from the addition of an inert gas such as nitrogen or argon. Suitable batch hydrothermal reactors are available, for example, from Parr Instruments Co. (Moline, Ill.). Suitable continuous hydrothermal reactors are described, for example, in U.S. Pat. No. 5,453,262 (Dawson et al.) and U.S. Pat. No. 5,652,192 (Matson et al.); Adschiri et al., *J. Am. Ceram. Soc.*, 75, 1019–1022 (1992); and Dawson, *Ceramic Bulletin*, 67 (10), 1673–1678 (1988).

In some methods, at least one of the hydrothermal treatments is in a continuous reactor. For example, the first hydrothermal treatment can be in a continuous reactor while the second hydrothermal treatment is in a batch reactor. In another example, the first hydrothermal treatment can be in a batch reactor while the second hydrothermal treatment is in a continuous reactor. In still another example, both the first and second hydrothermal treatments are in a continuous reactor.

The first hydrothermal treatment can be in a batch reactor at a temperature in the range of 150° C. to 300° C., in the range of 155° C. to 250° C., or in the range of 160° C. to 200° C. In some first hydrothermal treatments in a batch reactor, the reactor is heated to the desired temperature and then cooled immediately. It may take, for example, about 1 hour to reach the desired temperature. In other first hydrothermal treatments in a batch reactor, the reaction temperature is held for at least 0.5 hours, at least 0.75 hours, at least 1 hour, or at least 2 hours. The time at the reaction temperature can be up to 3 hours, up to 3.5 hours, up to 4 hours, up to 5 hours, up to 6 hours, or up to 8 hours in a batch reactor. For example, the time the reaction temperature is held can be 0.25 to 8 hours, 0.5 to 6 hours, or 0.75 to 3.5 hours.

Alternatively, the first hydrothermal treatment can be in a continuous reactor at a temperature in the range of 150° C. to 300° C., in the range of 160° C. to 250° C., in the range of 170° C. to 220° C., or in the range of 180° C. to 215° C. for a period of at least 1 minute. In some continuous reactors, the residence time is at least 2 minutes, at least 3 minutes, at least 3.5 minutes, or at least 4 minutes. The residence time can be up to 8 minutes, up to 10 minutes, up to 12 minutes, up to 15 minutes, or up to 20 minutes in a continuous reactor. For example, the residence time in a continuous reactor can be 1 to 20 minutes, 2 to 15 minutes, or 3 to 10 minutes.

The zirconium salts and optional yttrium salts in the first feedstock undergo only partial hydrolysis during the first hydrothermal treatment. The product of the first hydrothermal treatment includes a zirconium-containing intermediate plus various byproducts in a liquid phase. If an optional yttrium salt is included in the first feedstock, the zirconium-containing intermediate also contains yttrium. The zirconium-containing intermediate is only partially hydrolyzed and is not crystalline zirconia. The zirconium-containing intermediate is essentially amorphous based on x-ray diffraction analysis. That is, the x-ray diffraction pattern for the zirconium-containing intermediate tends to have broad peaks rather than the relatively narrow peaks indicative of crystalline material.

The percent conversion (i.e., the extent of hydrolysis) can be calculated, for example, using Thermal Gravimetric Analysis (TGA). This method of calculating the percent conversion is particularly suitable when the carboxylate anions in the first feedstock are free of polyether carboxylates, free of carboxylates having more than four carbon atoms, or combinations thereof. The percent conversion of the zirconium-containing intermediate can be given by the following equation % Conversion=$100(A-B)/(A-C)$ where A is the percent weight loss of the first feedstock, B is the percent weight loss of the zirconium-containing intermediate, and C is the percent weight loss of the zirconia sol. The percent weight loss for the first feedstock, the intermediate, and the zirconia sol is determined by drying each sample at 120° C. for 30 minutes before analysis. After equilibration at 85° C. in the thermal gravimetric analyzer, each sample is heated at a rate of 20° C./minute to 200° C. The temperature is held at 200° C. for 20 minutes, increased at a rate of 20° C./minute to 900° C., and held at 900° C. for 20 minutes. The percent weight loss can be calculated from the following equation % weight loss=$100 \text{ (weight}_{200C}-\text{weight}_{900C})/\text{weight}_{900C}$ for the first feedstock, the zirconium-containing intermediate, and the zirconia sol. The percent weight loss corresponds to what is not an inorganic oxide in each of the dried samples.

The percent conversion of the zirconium-containing intermediate is typically 40 to 75 percent. In some methods, the percent conversion of the zirconium-containing intermediate is 45 to 70 percent, 50 to 70 percent, 55 to 70 percent, or 55 to 65 percent. The percent conversion can be used to select suitable conditions for the first hydrothermal treatment.

If the hydrolysis reaction during the first hydrothermal treatment is allowed to proceed to produce a zirconium-containing intermediate with a percent conversion greater than about 75 percent, the final zirconia sol tends to contain associated (e.g., aggregated and/or agglomerated) rather than non-associated primary particles of zirconia. Although not wanting to be bound by theory, it is advantageous to remove at least a portion of the byproducts of the hydrolysis reaction during the course of the reaction. Thus, it is advantageous to subject the first feedstock to a first hydrothermal treatment and remove a portion of the byproduct prior to the second hydrothermal treatment.

The second feedstock, the material that is subjected to the second hydrothermal treatment, is prepared from the product of the first hydrothermal treatment. The preparation of the second feedstock usually involves removing at least some of the byproducts that are produced during the first hydrothermal treatment. An acid, which can be formed from the anion of the zirconium salt and the optional yttrium salt, is often one of the byproducts of the first hydrothermal treatment. When the acidic byproduct is a carboxylic acid having no more than four carbon atoms, the acid can be removed by a variety of methods such as vaporization, dialysis, ion exchange, precipitation, filtration, and the like.

The removal of at least some of the byproducts of the first hydrothermal treatment also can result in the removal of at least some of the liquid phase (e.g., aqueous medium). That is, an intermediate concentrate can be formed. In some embodiments, only a portion of the liquid phase is removed (i.e., the intermediate concentrate has a liquid phase). For example, some products of the first hydrothermal treatment contain a solid phase that can be separated from part of the liquid phase (e.g., the solid phase can settle out of the liquid phase). At least a portion of the liquid phase can be removed by methods such as by siphoning, decantation, or centrifugation. In other embodiments, the product of the first hydrothermal treatment is dried to form a residue (i.e., the intermediate concentrate has little or no liquid phase). The solids of the intermediate concentrate are often in the range of 10 to 100 weight percent.

The intermediate concentrate typically contains at least 5 weight percent zirconium, at least 8 weight percent zirconium, at least 10 weight percent zirconium, at least 20 weight percent zirconium, or at least 30 weight zirconium. The intermediate concentrate can contain up to 30 weight percent zirconium, up to 40 weight percent zirconium, up to 50 weight percent zirconium, or up to 52 weight percent zirconium. For example, the intermediate concentrate can contain 5 to 52 weight percent zirconium or 8 to 52 weight percent zirconium.

The intermediate concentrate, if the solids are no greater than 50 weight percent, can be used as the second feedstock. Alternatively, the intermediate concentrate can be diluted with water (e.g., deionized water) to form the second feedstock. The second feedstock often contains 0.5 to 50 weight percent solids or 3 to 40 weight percent solids when the second hydrothermal reactor is a batch reactor. The second feedstock often contains 0.5 to 25 weight percent solids or 7 to 22 weight percent solids when the second hydrothermal reactor is a continuous reactor.

The second feedstock typically contains at least 0.3 weight percent zirconium. When the second reactor is a batch reactor, the second feedstock often contains at least 0.5 weight percent zirconium, at least 1 weight percent zirconium, or at least 2 weight percent zirconium. The second feedstock for a batch reactor can contain up to 15 weight percent zirconium, up to 20 weight percent zirconium, up to 21 weight percent zirconium, up to 25 weight percent zirconium, or up to 26 weight percent zirconium. For example, the second feedstock for a batch reactor can contain 0.3 to 26 weight percent zirconium or 2 to 21 weight percent zirconium. When the second reactor is a continuous reactor, the second feedstock often contains at least 1 weight percent zirconium, at least 2 weight percent zirconium, at least 4 weight percent zirconium, or at least 8 weight percent zirconium. The second feedstock for a continuous reactor often contains up to 11 weight percent zirconium, up to 12 weight percent zirconium, or up to 13 weight percent zirconium. For example, the second feedstock for a continuous reactor can contain 0.3 to 13 weight percent zirconium or 8 to 11 weight percent zirconium.

The pH of the second feedstock is typically less than 7. For example, the second feedstock can have a pH that is no greater than 6 or no greater than 5.

The second feedstock is subjected to a second hydrothermal treatment to form a zirconia sol. If a batch reactor is used for the second hydrothermal treatment, the reaction temperature is often in the range of 150° C. to 300° C., in the range of 160° C. to 250° C., or in the range of 175° C. to 200° C. for a period of at least 30 minutes. In some batch reactors, the residence time is at least 1 hour, at least 2 hours, or at least 4 hours. The residence time can be up to 8 hours, up to 10 hours, up to 12 hours, up to 14 hours, up to 16 hours, up to 18 hours, or up to 24 hours in a batch reactor. For example, the residence time in a batch reactor can be 0.5 to 24 hours, 1 to 18 hours, or 1 to 14 hours. Alternatively, the second hydrothermal treatment can be in a continuous reactor at a temperature in the range of 150° C. to 300° C., in the range of 160° C. to 250° C., in the range of 180° C. to 220° C., or in the range of 200° C. to 215° C. for a period of at least 1 minute. In some continuous reactors, the residence time is at least 1 minutes, at least 2 minutes, at least 5 minutes, or at least 10 minutes. The residence time can be up to 60 minutes, up to 80 minutes, up to 90 minutes, up to 100 minutes, or up to 120 minutes in a continuous reactor. For example, the residence time in a continuous reactor can be 1 to 120 minutes, 5 to 100 minutes, or 10 to 90 minutes.

During the second hydrothermal treatment, the zirconium-containing intermediate undergoes further hydrolysis. The product of the second hydrothermal treatment is a zirconia sol that contains crystalline zirconia particles. The zirconia sol can be dried at a temperature of 120° C. to provide zirconia particles that typically contains 75 to 95 weight percent inorganic oxides. The zirconia particles can contain yttrium oxide (i.e., $Y_2O_3$) in addition to zirconia (i.e., $ZrO_2$). The zirconia particles can also contain some organic material.

In some embodiments, the zirconia sol is further treated to at least partially remove the byproducts formed during the second hydrothermal treatment. The byproducts are often acids formed from the anion of the zirconium salt or the optional yttrium salt. It is often desirable to remove the acidic byproduct if the zirconia particles in the zirconia sol will be combined with an organic matrix to form a composite material. For example, the acidic byproduct can be a carboxylic acid that can be removed by vaporization, ion exchange, precipitation, or dialysis. The zirconia sol often contains 0.5 to 55 weight percent solids or 2 to 51 weight percent solids.

The zirconia sol typically contains at least 0.3 weight percent zirconium. For example, the zirconia sol can contain at least 1 weight percent zirconium, at least 2 weight percent zirconium, at least 5 weight percent zirconium, or at least 10 weight percent zirconium. The zirconia sol often contains up to 34 weight percent zirconium, up to 35 weight percent zirconium, or up to 37 weight percent zirconium. For example, the zirconia sol can contain 0.3 to 37 weight percent zirconia, 0.5 to 35 weight percent zirconium, or 1 to 34 weight percent zirconium.

The method of making zirconia particles can further include removing the zirconia particles from the sol, modifying the surface of the zirconia particles in the sol, or a combination thereof.

The method of preparing the zirconia sol includes at least two hydrothermal treatments. In some embodiments, more than two hydrothermal treatments are used. Between each hydrothermal treatment, at least some of the acidic byproducts formed in the preceding hydrothermal treatment can be removed.

Zirconia Particles and Zirconia Sols

In another aspect, zirconia particles are provided that contain yttrium in an amount of 0.1 to 8 weight percent based on the weight of the inorganic oxides (e.g., $Y_2O_3$ and $ZrO_2$) in the zirconia particles. The zirconia particles have an average primary particle size no greater than 50 nanometers, a dispersion index of 1 to 3, a ratio of intensity-average particle size to volume-average particle size no greater than 3.0, and a crystal structure that is at least 70 percent cubic, tetragonal, or combinations thereof.

The yttrium in the zirconia particles is often in the form of yttrium oxide. The amount of yttrium is in the range of 0.1 to 8 weight percent based on the weight of the inorganic oxides in the zirconia particles. For example, the amount of yttrium can be in the range of 0.5 to 8 weight percent, 1 to 5 weight percent, or 1 to 4 weight percent based on the weight of the inorganic oxides in the zirconia particles.

The zirconia particles often contain at least some organic material in addition to inorganic oxides. The organic material can be attached to the surface of the zirconia particles and often originates from the anions of the salts in the precursor solution. The zirconia particles often contain up to 15 weight percent, up to 12 weight percent, up to 10 weight percent, up to 8 weight percent, or up to 6 weight percent organic material based on the weight of the particles.

The zirconia particles are crystalline. Crystalline zirconia tends to have a higher refractive index and higher x-ray scattering capability than amorphous zirconia. Due to the difficulty in separately quantifying cubic and tetragonal crystal structures for small particles using x-ray diffraction (i.e., the (111) peak for cubic zirconia often overlaps with the (101) peak for tetragonal zirconia), these two crystal structures are combined. For example, the combination of these two peaks appears at about 30.5 degrees two theta in the x-ray diffraction pattern shown in FIG. 1. At least 70 percent of the zirconia has a cubic structure, tetragonal structure, or a combination thereof with the balance being monoclinic. For example, in some zirconia sols, at least 75 percent, at least 80 percent, or at least 85 percent of the zirconia particles have a cubic crystal structure, tetragonal crystal structure, or a combination thereof. Cubic and tetragonal crystal structures tend to promote the formation of low aspect ratio primary particles having a cube-like shape when viewed under an electron microscope.

The zirconia particles usually have an average primary particle size no greater than 50 nanometers, no greater than 40 nanometers, no greater than 30 nanometer, no greater than 25 nanometers, or no greater than 20 nanometers. The primary particle size, which refers to the non-associated particle size of the zirconia particles, can be determined by x-ray diffraction as described in the Examples section.

The particles of zirconia tend to exist in a substantially non-associated (i.e., non-aggregated and non-agglomerated) form in the sol. The extent of association between the primary particles can be determined from the hydrodynamic particle size. The hydrodynamic particle size is measured using Photon Correlation Spectroscopy and is described in more detail in the Examples section. The term "hydrodynamic particle size" and "volume-average particle size" are used interchangeably herein. If the particles of zirconia are associated, the hydrodynamic particle size provides a measure of the size of the aggregates and/or agglomerates of primary particles in the zirconia sol. If the particles of zirconia are non-associated, the hydrodynamic particle size provides a measure of the size of the primary particles.

A quantitative measure of the degree of association between the primary particles in the zirconia sol is the dispersion index. As used herein the "dispersion index" is defined as the hydrodynamic particle size divided by the primary particle size. The primary particle size (e.g., the weighted average crystallite size) is determined using x-ray diffraction techniques and the hydrodynamic particle size (e.g., the volume-average particle size) is determined using Photon Correlation Spectroscopy. As the association between primary particles in the sol decreases, the dispersion index approaches a value of 1. The zirconia particles typically have a dispersion index of 1 to 5, 1 to 4, 1 to 3, 1 to 2.5, or 1 to 2.

Photon Correlation Spectroscopy can be used to further characterize the zirconia particles in the sol. For example, the intensity of the light scattered by particles is proportion to the sixth power of the particle diameter. Consequently, the light-intensity distribution tends to be more sensitive to larger particles than smaller ones. The intensity-average size (e.g., measured in nanometers) is, in effect, the size of a particle that corresponds to the mean value of the light intensity distribution measured by the instrument. The zirconia particles tend to have an intensity-average size that is no greater than 70 nanometers, no greater than 60 nanometers, no greater than 50 nanometers, no greater than 40 nanometers, no greater than 35 nanometers, or no greater than 30 nanometers.

The light-intensity distribution obtained during analysis using Photon Correlation Spectroscopy can be combined with the refractive indices of the particles and the refractive index of the suspending medium to calculate a volume distribution for spherical particles. The volume distribution gives the percentage of the total volume of particles corresponding to particles of a given size range. The volume-average size is the size of a particle that corresponds to the mean of the volume distribution. Since the volume of a particle is proportional to the third power of the diameter, this distribution is less sensitive to larger particles than the intensity-average size. That is, the volume-average size will typically be a smaller value than the intensity-average size. The zirconia sols typically have a volume-average size that is no greater than 50 nanometers, no greater than 40 nanometers, no greater than 30 nanometers, no greater than 25 nanometers, no greater than 20 nanometers, or no greater than 15 nanometers. The volume-average size is used in the calculation of the dispersion index.

For a sample that has particles of only one size, the intensity-average size and volume-average size will be the same. Therefore, the ratio of the intensity-average size to the volume-average size gives a measure of the spread of sizes in the particles. Larger ratios correspond to broader particle size distributions. The zirconia particles typically have a ratio of intensity-average size (i.e., measured in nanometers) to volume-average size (i.e., measured in nanometers) that is no greater than 3.0, no greater than 2.5, no greater than 2.0, no greater than 1.8, no greater than 1.7, or no greater than 1.6.

The zirconia sols often have a high optical transmission due to the small size and non-associated form of the primary zirconia particles in the sol. High optical transmission of the sol can be desirable in the preparation of transparent or translucent composite materials. As used herein, "optical transmission" refers to the amount of light that passes through a sample (e.g., a zirconia sol) divided by the total amount of light incident upon the sample and may be calculated using the following equation:

% Transmission=$100(I/I_O)$ where I is the light intensity passing though the sample and $I_O$ is the light intensity incident on the sample. The optical transmission may be determined using an ultraviolet/visible spectrophotometer set at a wavelength of 600 nanometers with a 1 cm path length.

The optical transmission is a function of the amount of zirconia in a sol. For zirconia sols having about 1 weight percent zirconia, the optical transmission is typically at least 70 percent, at least 80 percent, or at least 90 percent. For zirconia sols having about 10 weight percent zirconia, the optical transmission is typically at least 20 percent, at least 50 percent, or at least 70 percent.

In another aspect, zirconia sols are provided that include zirconia particles dispersed in an aqueous medium that contains a carboxylic acid having no greater than four carbon atoms and that is substantially free of polyether carboxylic acids. As used herein, the term "substantially free of polyether carboxylic acids" means that less than 1 mole percent of the carboxylic acids in the aqueous medium are polyether carboxylic acids or the corresponding polyether carboxylate. Preferably, less than 0.5 mole percent, less than 0.2 mole percent, or less than 1 mole percent of the carboxylic acids in the aqueous medium are polyether carboxylic acids or the corresponding polyether carboxylate. The zirconia particles have an average primary particle size no greater than 50 nanometers, a dispersion index of 1 to 5 (e.g., 1 to 4 or 1 to 3), a ratio of intensity-average particle size to volume-average particle size no greater than 3.0.

In some embodiments of the zirconia sol, the zirconia particles contain 0.1 to 8 weight percent yttrium based on the weight of the inorganic oxides in the zirconia particles and have a crystal structure that is at least 70 percent cubic, tetragonal, or combinations thereof. Zirconia particles that contain yttrium often have a dispersion index of 1 to 3.

In other embodiments of the zirconia sol, the zirconia particles are substantially free of yttrium. As used herein, the term "substantially free of yttrium" refers to zirconia particles that contain no yttrium or that have less then 0.1 weight percent yttrium based on the weight of the inorganic oxides in the zirconia particles. The zirconia particles that are substantially free of yttrium have a crystal structure that is at least 50 percent cubic, tetragonal, or combinations thereof.

The zirconia sols often are substantially free of halides and substantially free of dispersants with a boiling point greater than or equal to 200° C. As used herein, the term "substantially free of halides" refers to a zirconia sol that has less than $10^{-2}$ moles/liter, less than $10^{-3}$ moles/liter, less than $10^{-4}$ moles/liter, or less than $10^{-5}$ moles/liter halide. As used herein, the term "substantially free of a dispersant" refers to a zirconia sol that has less than $10^{-2}$ moles/liter, less than $10^{-3}$ moles/liter, or less than $10^{-4}$ moles/liter dispersant having a boiling point greater than or equal to 200° C.

Composite Materials

In yet another aspect, a composite material is provided that includes zirconia particles dispersed in an organic matrix. The organic matrix material can include a monomer, oligomer, polymer, copolymer, or a combination thereof. The zirconia particles can be combined with an organic matrix material to provide a transparent or translucent composite material. Compared to the organic matrix material, the composite material can have an increased index of refraction, an increased opacity to x-rays, or a combination thereof.

The zirconia particles in one embodiment of the composite material contain yttrium in an amount of 0.1 to 8 weight percent based on the weight of the inorganic oxides (e.g., $Y_2O_3$ and $ZrO_2$) in the zirconia particles. The zirconia particles have an average primary particle size no greater than 50 nanometers, a dispersion index of 1 to 3, a ratio of intensity-average particle size to volume-average particle size no greater than 3.0, and a crystal structure that is at least 70 percent cubic, tetragonal, or combinations thereof.

Additionally, methods of making a composite material are provided. A first method includes forming a zirconia sol, adding an organic matrix material, and removing at least a portion of a liquid phase from the zirconia sol. The zirconia sol is formed by preparing a first feedstock that contains a zirconium salt, subjecting the first feedstock to a first hydrothermal treatment to form a zirconium-containing intermediate and a byproduct, forming a second feedstock by removing at least a portion of the byproduct of the first hydrothermal treatment, and subjecting the second feedstock to a second hydrothermal treatment.

A second method of making a composite material includes providing a zirconia sol that contains zirconia particles dispersed in an aqueous medium, adding an organic matrix material, and removing at least a portion of the aqueous medium from the zirconia sol. The aqueous medium of the zirconia sol includes a carboxylic acid that contains no greater than four carbon atoms and that is substantially free of a polyether carboxylic acid. The zirconia particles have an average primary particle size no greater than 50 nanometers, a dispersion index of 1 to 5, a ratio of intensity-average particle size to volume-average particle size no greater than 3.0, and a crystal structure that is at least 50 percent cubic, tetragonal, or a combination thereof. In some embodiments of the zirconia sol, the zirconia particles contain 0.1 to 8 weight percent yttrium based on the weight of the inorganic oxides in the zirconia particles and have a crystal structure that is at least 70 percent cubic, tetragonal, or a combination thereof.

The zirconia particles are often surface modified to improve compatibility with the organic matrix material. Surface modification involves reacting the zirconia particles with a surface modification agent or combination of surface modification agents that attach to the surface of the zirconia particles and that modify the surface characteristics of the zirconia particles.

Surface modification agents may be represented by the formula A-B where the A group is capable of attaching to the surface of a zirconia particle, and where B is a compatibilizing group. The A group can be attached to the surface by adsorption, formation of an ionic bond, formation of a covalent bond, or a combination thereof. Suitable examples of A groups include, for example, carboxylic acids or salts thereof, sulfonic acids or salts thereof, phosphoric acids or salts thereof, phosphonic acids and salts thereof, silanes, and the like. The compatabilizing group B can be reactive or nonreactive and can be polar or non-polar.

Compatibilizing groups B that can impart polar character to the zirconia particles include, for example, polyethers. Representative examples of polar modifying agents having carboxylic acid functionality include MEEAA, MEAA, and mono(polyethylene glycol)succinate.

Compatibilizing groups B that can impart non-polar character to the zirconia particles include, for example, linear or branched aromatic or aliphatic hydrocarbons. Representative examples of non-polar modifying agents having carboxylic acid functionality include octanoic acid, dodecanoic acid, stearic acid, oleic acid, and combinations thereof.

Exemplary silanes include, but are not limited to, alkyltrialkoxysilanes such as n-octyltrimethoxysilane, n-octyltriethoxysilane, isooctyltrimethoxysilane, dodecyltrimethoxysilane, octadecyltrimethoxysilane, propyltrimethoxysilane, and hexyltrimethoxysilane; methacryloxyalkyltrialkoxysilanes or acryloxyalkyltrialkoxysilanes such as 3-methacryloxypropyltrimethoxysilane, 3-acryloxypropyltrimethoxysilane, and 3-(methacryloxy)propyltriethoxysilane; methacryloxyalkylalkyldialkoxysilanes or acryloxyalkylalkyldialkoxysilanes such as 3-(methacryloxy)propylmethyldimethoxysilane, and 3-(acryloxypropyl)methyldimethoxysilane; methacryloxyalkyldialkylalkoxysilanes or acyrloxyalkyldialkylalkoxysilanes such as 3-(methacryloxy)propyldimethylethoxysilane; mercaptoalkyltrialkoxysilanes such as 3-mercaptopropyltrimethoxysilane; aryltrialkoxysilanes such as styrylethyltrimethoxysilane, phenyltrimethoxysilane, phenyltriethoxysilane, and p-tolyltriethoxysilane; vinyl silanes such as vinylmethyldiacetoxysilane, vinyldimethylethoxysilane, vinylmethyldiethoxysilane, vinyltrimethoxysilane, vinyltriethoxysilane, vinyltriacetoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, and vinyltris(2-methoxyethoxy)silane; 3-glycidoxypropyltrialkoxysilane such as glycidoxypropyltrimethoxysilane; polyether silanes such as N-(3-triethoxysilylpropyl)methoxyethoxyethoxyethyl carbamate (PEG3TES), N-(3-triethoxysilylpropyl)methoxyethoxyethoxyethyl carbamate (PEG2TES), and SILQUEST A-1230); and combinations thereof.

Non-silane surface modifying agents reactive with the organic matrix material include, for example, acrylic acid, methacrylic acid, beta-carboxyethyl acrylate, mono-2-(methacryloxyethyl)succinate, and combinations thereof. A useful surface modification agent that can impart both polar character and reactivity to the zirconia particles is mono (methacryloxypolyethyleneglycol) succinate. This material may be particularly suitable for addition to radiation curable acrylate and/or methacrylate organic matrix materials.

Generally, the surface modification may be accomplished by simple addition of a surface modifying agent to a zirconia sol. Optionally, a water miscible cosolvent may be used to increase the solubility of the surface modifying agent and/or compatibility of the surface modified zirconia particles in the aqueous phase. Suitable cosolvents include water-miscible organic compounds such as, for example, 1-methoxy-2-propanol, ethanol, isopropanol, ethylene glycol, N,N-dimethylacetamide, N-methyl pyrrolidone, or the like. The cosolvents can enhance the solubility of the surface modifying agent as well as the solubility of the surface modified particles.

The surface modification reactions can occur at room temperature (e.g., 20° C. to 25° C.) or at elevated temperatures (e.g., up to about 95° C.). When the surface modification agents are acids, the zirconia particles typically can be surface modified at room temperature. The surface modification reactions can be under acidic or basic conditions depending on the particular surface modifying agent. For example, silanes can be heated with the zirconia sol under acidic conditions. A base such as aqueous ammonia can be added to precipitate the zirconia particles. The precipitated zirconia particles with attached surface modifying agents can be separated (e.g., filtered) from the liquid phase. The separated zirconia particles can then be dispersed in a water miscible solvent.

Various methods may be used to combine the zirconia sol of the present invention with an organic matrix material. In one embodiment, a solvent exchange procedure may be utilized. In the solvent exchange procedure, the organic matrix material is first added to the surface modified zirconia sol. Optionally, prior to addition of the organic matrix material, a co-solvent such as 1-methoxy-2-propanol or N-methyl pyrrolidone may be added to the zirconia sol to improve miscibility of the organic matrix material in the water. After addition of the organic matrix material, the water and optional co-solvent can be removed by evaporation, leaving the zirconia particles dispersed in the organic matrix material. Suitable evaporation methods include, for example, distillation, rotary evaporation, oven drying, and the like.

Alternatively, another method for preparing a composite material includes drying of the zirconia sol to produce a powder of zirconia particles and then dispersing the zirconia particles in an organic matrix. The zirconia sol can be dried to a powder using conventional means such as oven drying or spray drying. For example, the zirconia sol can be dried in a conventional oven at a temperature of at least 70° C. Some zirconia sols can be dried at a temperature of 70° C. to 90° C. for about 2 to 4 hours.

In yet another method of preparing a composite material, the zirconia particles in the zirconia sol are surface modified with a non-polar carboxylic acid such as, for example, oleic acid. The non-polar acid surface modifies the zirconia particles causing them to flock into a filterable mass. The zirconia particles may then be separated from the liquid phase of the zirconia sol by filtration, optionally dried, and combined with the organic matrix material.

In still another method of preparing a composite material, the zirconia particles in the zirconia sol are surface modified with a surface modifier having a non-polar B group. The surface modified zirconia particles can be extracted into a water immiscible solvent or monomer, for example, toluene, hexane, ethyl acetate, styrene, or the like.

Representative examples of polymerizable monomers that can be used to form the organic matrix of the composite material include acrylates, methacrylates, styrenes, epoxies and the like. Also, reactive oligomers such as acrylated or methacrylated polyesters, polyurethanes, or acrylics may also be used. The resulting composite material may be shaped or coated and then polymerized, for example, via a free-radical mechanism. Photopolymerization may be initiated by the use of a photoinitiator such as that commercially available from Ciba Specialty Chemicals, Tarrytown, N.Y. under the trade designation "IRGACURE" and "DAROCUR" or from BASF, Mt. Olive, N.Y. under the trade designation "LUCERIN". Other suitable polymerization initiators include, for example, organic peroxides, azo compounds, and the like.

The zirconia sols may also be combined with other types of polymers or copolymers such as polyolefins, polyesters, polyurethanes, polymethylmethacrylates, polystyrenes, polycarbonates, polyimides, and the like. Suitable techniques for combining the zirconia sol with a thermoplastic polymer include, for example, extrusion, milling, or Brabender mixing. Surface modification agents should be selected to be stable at the desired processing temperature.

The resultant composite material, prepared using any of the above methods, often has at least one of the following properties: optical clarity, high refractive index, and high opacity to x-rays. The composite material also has at least one of the following properties: high modulus, hardness, and the processibility and flexibility of the organic matrix.

Suitable examples of composite materials include, but are not limited to, dental materials as described in U.S. Patent Application Publication 2002/0156162 A1 and U.S. Pat. No. 6,387,981, the disclosures of which are incorporated herein by reference. In general, the refractive index of a composite material increases linearly with volume fraction of the zirconia particles in the organic matrix. To obtain a high index of refraction, an organic matrix material having a high index of refraction is generally preferred. Zirconia particles from the zirconia sol of the present invention may be used to further increase the refractive index of the organic matrix. When combined with an organic matrix material the resulting composite materials may achieve a refractive index of at least 1.60, at least 1.66, or at least 1.75.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

| Table of Abbreviations | |
|---|---|
| Abbreviation or Trade Designation | Description |
| MEEAA | 2-(2-(2-Methoxyethoxy) Ethoxy) Acetic Acid |
| Zirconium Acetate Solution | An aqueous solution of zirconium acetate containing nominally 14.8 weight percent Zr that is commercially available from Nyacol Nano Technologies, Inc. (Ashland, MA) and Magnesium Elektron, Inc. (Flemington, NJ). |
| DI water | De-ionized water |
| Yttrium Acetate Hydrate | $Y(CH_3COO)_3 \cdot 4H_2O$ |
| Beta-CEA | Beta-carboxyethyl acrylate, commercially available from UCB Chemicals (Atlanta, GA) |
| TBPEA | Tribromophenoxyethylacrylate, commercially available from Dai-Chi Kogyo Seiyaku Co., Ltd. (Kyoto, Japan) |
| Acryloxypropyl trimethoxy Silane | Commercially available from Gelest (Tullytown, PA) |

-continued

Table of Abbreviations

| Abbreviation or Trade Designation | Description |
| --- | --- |
| SILQUEST A1230 | A polyether silane commercially available from OSI Specialties (Danbury, CT) |
| PEA | Phenoxyethyl acrylate, commercially available from Sartomer (Exton, PA) |
| PROSTABB 5198 | A radical inhibitor that is commercially available from Ciba Specialties (Hawthorne, NY) |
| 1-Methoxy-2-propanol | Commercially available from Aldrich Chemical (Milwaukee, WI) |
| LUCERIN TPO-L | A photoinitiator that is commercially available from BASF (Mt. Olive, NJ) |
| SARTOMER SR399 | Dipentaerythritol acrylate esters commercially available from Sartomer (Exton, PA) |
| Acetone | Commercially available from J. T. Baker |

Test Methods

Photon Correlation Spectroscopy (PCS)

The volume-average particle size was determined by Photon Correlation Spectroscopy (PCS) using a Malvern Series 4700 particle size analyzer (available from Malvern Instruments Inc., Southborough, Mass.). Dilute zirconia sol samples were filtered through a 0.2 µm filter using syringe-applied pressure into a glass cuvette that was then covered. Prior to starting data acquisition the temperature of the sample chamber was allowed to equilibrate at 25° C. The supplied software was used to do a CONTIN analysis with an angle of 90 degrees. CONTIN is a widely used mathematical method for analyzing general inverse transformation problems that is further described in S. W. Provencher, *Comput. Phys. Commun.*, 27, 229 (1982). The analysis was performed using 24 data bins. The following values were used in the calculations: refractive index of water equal to 1.333, viscosity of water equal to 0.890 centipoise, and refractive index of the zirconia particles equal to 1.9.

Two particle size measurements were calculated based on the PCS data. The intensity-average particle size, reported in nanometers, was equal to the size of a particle corresponding to the mean value of the scattered light intensity distribution. The scattered light intensity was proportional to the sixth power of the particle diameter. The volume-average particle size, also reported in nanometers, was derived from a volume distribution that was calculated from the scattered light intensity distribution taking into account both the refractive index of the zirconia particles and the refractive index of the dispersing medium (i.e., water). The volume-average particle size was equal to the particle size corresponding to the mean of the volume distribution.

The intensity-average particle size was divided by the volume-average particle size to provide a ratio that is indicative of the particle size distribution.

Crystalline Structure and Size (XRD Analysis)

The particle size of a dried zirconia sample was reduced by hand grinding using an agate mortar and pestle. A liberal amount of the sample was applied by spatula to a glass microscope slide on which a section of double coated tape had been adhered. The sample was pressed into the adhesive on the tape by forcing the sample against the tape with the spatula blade. Excess sample was removed by scraping the sample area with the edge of the spatula blade, leaving a thin layer of particles adhered to the adhesive. Loosely adhered materials remaining after the scraping were remove by forcefully tapping the microscope slide against a hard surface. In a similar manner, corundum (Linde 1.0 µm alumina polishing powder, Lot Number C062, Union Carbide, Indianapolis, Ind.) was prepared and used to calibrate the diffractometer for instrumental broadening.

X-ray diffraction scans were obtained using a Philips vertical diffractometer having a reflection geometry, copper $K_\alpha$ radiation, and proportional detector registry of the scattered radiation. The diffractometer was fitted with variable incident beam slits, fixed diffracted beam slits, and graphite diffracted beam monochromator. The survey scan was conducted from 25 to 55 degrees two theta (2θ) using a 0.04 degree step size and 8 second dwell time. X-ray generator settings of 45 kV and 35 mA were employed. Data collections for the corundum standard were conducted on three separate areas of several individual corundum mounts. Data was collected on three separate areas of the thin layer sample mount.

The observed diffraction peaks were identified by comparison to the reference diffraction patterns contained within the International Center for Diffraction Data (ICDD) powder diffraction database (sets 1–47, ICDD, Newton Square, Pa.) and attributed to either cubic/tetragonal (C/T) or monoclinic (M) forms of zirconia. The (111) peak for the cubic phase and (101) peak for the tetragonal phase could not be separated so these phases were reported together. The amounts of each zirconia form were evaluated on a relative basis and the form of zirconia having the most intense diffraction peak was assigned the relative intensity value of 100. The strongest line of the remaining crystalline zirconia form was scaled relative to the most intense line and given a value between 1 and 100.

Peak widths for the observed diffraction maxima due to corundum were measured by profile fitting. The relationship between mean corundum peak widths and corundum peak position (2θ) was determined by fitting a polynomial to these data to produce a continuous function used to evaluate the instrumental breadth at any peak position within the corundum testing range. Peak widths for the observed diffraction maxima due to zirconia were measured by profile fitting observed diffraction peaks. The following peak widths were evaluated depending on the zirconia phase found to be present:

Cubic/Tetragonal (C/T): (111)

Monoclinic (M): (−111), and (111)

A Pearson VII peak shape model with $K_{\alpha 1}$ and $K_{\alpha 2}$ wavelength components accounted for, and linear background model were employed in all cases. Widths were found as the peak full width at half maximum (FWHM) having units of degrees. The profile fitting was accomplished by use of the capabilities of the JADE diffraction software suite. Sample peak widths were evaluated for the three separate data collections obtained for the same thin layer sample mount.

Sample peaks were corrected for instrumental broadening by interpolation of instrumental breadth values from corundum instrument calibration and corrected peak widths converted to units of radians. The Scherrer equation was used to calculate the primary crystal size.

Crystallite Size $(D) = K\lambda/\beta(\cos\theta)$

In the Scherrer equation,
K=form factor (here 0.9);
λ=wavelength (1.540598 Å);
β=calculated peak width after correction for instrumental broadening (in radians)=[calculated peak FWHM−instrumental breadth] (converted to radians) where FWHM is full width at half maximum; and
θ=½ the peak position (scattering angle).

The cubic/tetragonal crystallite size was measured as the average of three measurements using (111) peak.

Cubic/Tetragonal Mean Crystallite Size=
[$D(111)_{area\ 1}+D(111)_{area\ 2}+D(111)_{area\ 3}$]/3

The monoclinic crystallite size was measured as the average of three measurement using the (−111) peak and three measurements using the (111) peak.

Monoclinic Mean Crystallite Size=[$D(-111)_{area\ 1}+D(-111)_{area\ 2}+D(-111)_{area\ 3}+D(111)_{area\ 1}+D(111)_{area\ 2}+D(111)_{area\ 3}$]/6

The weighted average of the cubic/tetragonal (C/T) and monoclininc phases (M) were calculated.

Weighted average=[(% C/T)(C/T size)+(% M)(M size)]/100

In this equation,
% C/T=the percent crystallinity contributed by the cubic and tetragonal crystallite content of the $ZrO_2$ particles;
C/T size=the size of the cubic and tetragonal crystallites;
% M=the percent crystallinity contributed by the monoclinic crystallite content of the $ZrO_2$ particles; and
M size=the size of the monoclinic crystallites.

Dispersion Index

The Dispersion Index is equal to the volume-average size measured by PCS divided by the weighted average crystallite size measured by XRD.

Weight Percent Solids

The weight percent solids were determined by drying a sample weighing 3 to 6 grams at 120° C. for 30 minutes. The percent solids can be calculated from the weight of the wet sample (i.e., weight before drying, $weight_{wet}$) and the weight of the dry sample (i.e., weight after drying, $weight_{dry}$) using the following equation.

wt-% solids=100 ($weight_{dry}$)/$weight_{wet}$

Thermal Gravimetric Analysis (TGA)

The percent conversion of the zirconium-containing intermediate and the weight percent inorganic oxides were determined by thermal gravimetric analysis using a Model 2950 TGA from TA Instruments (New Castle, Del.).

To determine the percent conversion of the zirconium containing intermediate, a sample (e.g., 3 to 6 grams) was initially heated at 120° C. in an oven for 30 minutes to dry. The dried sample (e.g., 30 to 60 mg) was equilibrated at 85° C. in the TGA. The temperature was then increased at a rate of 20° C./minute to 200° C., held at 200° C. for 20 minutes, increased at 20° C./minute to 900° C., and held at 900° C. for 20 minutes. The organic material was volatilized between 200° C. and 900° C. leaving only the inorganic oxides such as $ZrO_2$ and $Y_2O_3$. The percent weight loss was calculated using the following equation.

% weight loss=100(%-$weight_{200C}$−%-$weight_{900C}$)/%-$weight_{900C}$

The %-$weight_{200C}$ was calculated from the weight of the sample at 200° C. ($weight_{200C}$) and from the weight of the dried sample ($weight_{dry}$ used for the analysis (e.g., sample dried at 120° C. before analysis).

%-$weight_{200C}$=100($weight_{200C}$)/$weight_{dry}$

The %-$weight_{900C}$ is calculated from the weight of the sample at 900° C. ($weight_{900C}$) and from the weight of the dried sample ($weight_{dry}$) used for the analysis (e.g., sample dried at 120° C. before analysis.

%-$weight_{900C}$=100($weight_{900C}$)/$weight_{dry}$

The percent conversion of the zirconium-containing intermediate is given by the following equation % Conversion=100(A−B)/(A−C)

where A is the percent weight loss of the first feedstock, B is the percent weight loss of the zirconium-containing intermediate, and C is the percent weight loss of the zirconia sol.

The weight percent inorganic oxide was calculated from the weight percent solids and the weight percent oxide at 900° C. That is, the weight percent inorganic oxide can be calculated using the following equation.

wt-% inorganic oxides=(wt-% solids)(%-$weight_{900C}$)/100

Index of Refraction

The refractive index was measured using an Abbe refractometer commercially available from Milton Roy Co. (Ivyland, Pa.).

Example 1

In a glass vessel, MEEAA (130.55 grams) was dissolved in the Zirconium Acetate Solution (735 grams). This mixture (i.e., aqueous precursor solution) was placed in a large, flat glass tray, and allowed to dry overnight in a forced air oven at 75° C. to 85° C. to yield 322 grams of dry mixed salt (i.e., concentrated precursor).

A sample of the dry mixed salt (54 grams) was dissolved in 900 grams of DI water. The clear solution was placed in a 2 liter PARR high-pressure reaction vessel equipped with an agitator. The reactor was purged with nitrogen and electrically heated to a temperature of 185° C. with stirring. This mixture was held at 185° C. for 15 minutes, then the electric heater was turned off and the mixture allowed to stir for an additional 15 minutes. At this time, the vessel was removed from the heater and cooled down quickly using an ice-water bath. This procedure provided a liquid phase and a solid phase. The liquid was siphoned off and the solid phase was put in a glass dish and placed in a pre-heated, forced air drying oven at 75° C. to 85° C. to yield a lightly colored, crumbly material (i.e., dried solid).

In a glass vessel a sample of the dried solid (6.0 grams) was dispersed in 14 grams of DI water and 10 grams of this mixture was weighed into a 20 mL Teflon-lined PARR reaction cell. The small reactor was placed into a 200° C. pre-heated oven for 4 hours, then removed and allowed to cool down in a cold-water bath. The product was a zirconia sol that was transparent and opalescent blue in color.

The zirconia sol was tested using the Test Methods outlined above. The results are shown in Table 1 (PCS Analysis) and Table 2 (XRD Analysis and Dispersion Index).

Example 2

In a glass vessel, MEEAA (130.55 grams) was dissolved in the Zirconium Acetate solution (735 grams). This mixture was placed in a large, flat glass tray, and allowed to dry overnight in a forced air oven at 75° C. to 85° C. to yield 322 grams of dry mixed salt.

A sample of the dry mixed salt (30 grams) was dissolved in 985 grams of DI water. The clear solution was placed in a 2 liter PARR high-pressure reaction vessel equipped with an agitator. The reactor was purged with nitrogen and electrically heated over a period of 1 hour to a temperature of 185° C. with stirring. The electric heater was turned off and the vessel was removed from the heater and cooled down quickly using an ice-water bath. This procedure provided a liquid phase and a solid phase. The liquid was siphoned off and the solid phase was put in a glass dish and placed in a pre-heated, forced air drying oven at 75° C. to 85° C. to yield a lightly colored, crumbly material (i.e., dried solid).

In a glass vessel, a sample of the dried solid (2.0 grams) was dispersed in 18 grams of DI water and 10 grams of this mixture was weighed into a 20 mL Teflon-lined PARR reaction cell. The small reactor was placed into a 200° C. pre-heated oven for 2.5 hours, then removed and allowed to cool down by placing in a cold-water bath to yield a solution that was transparent and opalescent blue in color (i.e., zirconia sol).

The zirconia sol was tested using the Test Methods outlined above. The results are shown in Table 1 (PCS Analysis) and Table 2 (XRD Analysis and Dispersion Index).

Example 3

In a glass vessel, MEEAA (26.46 grams) was dissolved in Zirconium Acetate Solution (735 grams). This mixture was placed in a large, flat glass tray, and allowed to dry overnight in a forced air oven at 75° C. to 85° C. to yield a dry mixed salt.

A sample of the dry mixed salt (81 grams) was dissolved in 1,350 grams of DI water. This clear solution was placed in a 2 liter PARR high-pressure reaction vessel equipped with an agitator. The reactor was purged with nitrogen and electrically heated to a temperature of 185° C. with stirring. This mixture was held at 185° C. for 15 minutes. At this time the vessel was removed from the heater and cooled down quickly using an ice-water bath. This provided a liquid phase and a solid phase. The liquid was siphoned off and the solid phase was put in a glass dish and placed in a pre-heated, forced air drying oven at 75° C. to 85° C. to yield a lightly colored, crumbly material (i.e., dried solid). This procedure was repeated three more times, and the dry solids were combined.

A sample of the dried solid (191.5 grams) was dispersed in 446.8 grams of DI water. The fine slurry was placed in a 2 liter PARR high-pressure reaction vessel equipped with an agitator. The reactor was purged with nitrogen and electrically heated to a temperature of 200° C. with stirring. This mixture was held at 200° C. for 1 hour. At this time the vessel was removed from the heater and cooled down quickly using an ice-water bath to yield a solution that was transparent and opalescent blue in color (i.e., zirconia sol).

The zirconia sol was tested using the Test Methods outlined above. The results are shown in Table 1 (PCS Analysis) and Table 2 (XRD Analysis and Dispersion Index). The x-ray diffraction pattern for this example is FIG. 1.

Example 4

Zirconium Acetate Solution was placed in a large, flat glass tray, and allowed to dry overnight in a forced air oven at 75 to 85° C. to yield a dry salt.

A sample of the dry salt was dissolved in DI water to make a 5 weight percent solution. The solution was pumped at a rate of 10 mL/min through 80 feet (24 meters) of stainless-steel tubing that was immersed in a bath of oil heated to 206° C. The stainless-steel tubing has an outer diameter of 0.125 inch (0.32 cm) and a wall thickness of 0.028 inch (0.071 cm). Following the reactor tube, the material passed through a coil of an additional 20 feet (6 meters) of stainless-steel tubing that was immersed in an ice-water bath to cool the material. The stainless-steel tubing has an outer diameter of 0.125 inch (0.32 cm) and a wall thickness of 0.028 inch (0.071 cm). A backpressure regulator valve was used to maintain an exit pressure of 240 to 250 psig (1.76 to 1.83 MPascals). The product was a liquid suspension of fine particles of a white solid. The percent conversion of the zirconium-containing intermediate was 64%.

The liquid suspension was concentrated to 10.2 percent solids using a rotary evaporator. The 581 g of the fine slurry was placed in a 2 liter PARR high-pressure reaction vessel equipped with an agitator. The reactor was purged with nitrogen and electrically heated to a temperature of 200° C. with stirring. This mixture was held at 200° C. for 1 hour. At this time the vessel was removed from the heater and cooled down quickly using an ice-water bath to yield a solution that was transparent and opalescent blue in color (i.e., zirconia sol).

The zirconia sol was tested using the Test Methods outlined above. The results are shown in Table 1 (PCS Analysis) and Table 2 (XRD Analysis and Dispersion Index).

TABLE 1

| Example | Intensity-average Size (nm) | Volume-average Size (nm) | Intensity-average: Volume-average Ratio |
| --- | --- | --- | --- |
| 1 | 23.7 | 16.8 | 1.41 |
| 2 | 43.7 | 22.1 | 1.98 |
| 3 | 38.0 | 17.5 | 2.17 |
| 4 | 57.0 | 24.2 | 2.36 |

TABLE 2

| Example | M Intensity | M Size (nm) | C/T Intensity | C/T Size (nm) | % C/T | XRD Average Size (nm) | Dispersion Index |
| --- | --- | --- | --- | --- | --- | --- | --- |
| 1 | 100 | 11.3 | 97 | 10.0 | 49 | 10.7 | 1.6 |
| 2 | 23 | 6.0 | 100 | 9.5 | 81 | 8.8 | 2.5 |
| 3 | 43 | 9.0 | 100 | 8.5 | 70 | 8.7 | 2.0 |
| 4 | 73 | 8.8 | 100 | 8.0 | 58 | 8.3 | 2.9 |

Example 5

In a glass vessel, yttrium acetate hydrate (19.275 grams) was dissolved in Zirconium Acetate Solution (750 grams)

and the solution was dried. The solid was dissolved in sufficient DI water to give a 12.5 weight percent solution (first feedstock).

The first feedstock was pumped at a rate of 80 mL/min through 100 feet (30 meters) of stainless-steel tubing (with an outside diameter of 0.25 inch (0.64 centimeter) and a wall thickness of 0.035 inch (0.089 cm)) that was immersed in a bath of oil heated to 206° C. Following the reactor tube, the material passed through a coil of an additional 20 feet (6 meters) of stainless-steel tubing that was immersed in an ice-water bath to cool the material. The stainless-steel tubing has an outer diameter of 0.25 inch (0.64 cm) and a wall thickness of 0.035 inch (0.089 cm). A backpressure regulator valve was used to maintain an exit pressure of 240 to 310 psig (1.76 to 2.24 MPascals). The product was a liquid suspension of fine particles of a white solid. The percent conversion of the zirconium-containing intermediate was 55%.

The liquid suspension was concentrated to 15.5 weight percent solids using a rotary evaporator. This concentrate was pumped at a rate of 15 mil/min through 100 feet (30 meters) of stainless-steel tubing that was immersed in a bath of oil heated to 206° C. The stainless-steel tubing has an outer diameter of 0.25 inch (0.64 cm) and a wall thickness of 0.035 inch (0.089 cm). Following the reactor tube, the material passed through a coil of an additional 20 feet (6 meters) of stainless-steel tubing that was immersed in an ice-water bath to cool the material. The stainless-steel tubing has an outer diameter of 0.25 inch (0.64 cm) and a wall thickness of 0.035 inch (0.089 cm). A backpressure regulator valve was used to maintain an exit pressure of 240 to 290 psig (1.76 to 2.10 MPascals). The product was a zirconia sol.

The zirconia sol was tested using the Test Methods outlined above. The results are shown in Table 3 (PCS Analysis) and Table 4 (XRD Analysis and Dispersion Index).

Example 6

In a glass vessel, yttrium acetate hydrate (51.4 grams) was dissolved in Zirconium Acetate Solution (2,000 grams) and the solution was concentrated to 60 percent solids using a rotary evaporator. The concentrate was diluted with sufficient DI water to give a 12.5 weight percent solution (i.e., first feedstock).

The first feedstock was pumped at a rate of 80 mL/min through 100 feet (30 meters) of stainless-steel tubing that was immersed in a bath of oil heated to 206° C. The stainless-steel tubing has an outer diameter of 0.25 inch (0.64 cm) and a wall thickness of 0.035 inch (0.089 cm). Following the reactor tube, the material passed through a coil of an additional 20 feet (6 meters) of stainless-steel tubing that was immersed in an ice-water bath to cool the material. The stainless-steel tubing has an outer diameter of 0.25 inch (0.64 cm) and a wall thickness of 0.035 inch (0.089 cm). A backpressure regulator valve was used to maintain an exit pressure of 240 to 310 psig (1.76 to 2.24 MPascals). The product was a liquid suspension of fine particles of a white solid. The percent conversion of the zirconium-containing intermediate was 52%.

The liquid suspension was concentrated to 15 weight percent solids using a rotary evaporator. This concentrate was pumped at a rate of 15 mL/min through 100 feet (30 meters) of stainless-steel tubing that was immersed in a bath of oil heated to 206° C. The stainless-steel tubing has an outer diameter of 0.25 inch (0.64 cm) and a wall thickness of 0.035 inch (0.089 cm). Following the reactor tube, the material passed through a coil of an additional 20 feet (6 meters) of stainless-steel tubing that was immersed in an ice-water bath to cool the material. The stainless-steel tubing has an outer diameter of 0.25 inch (0.64 cm) and a wall thickness of 0.035 inch (0.089 cm). A backpressure regulator valve was used to maintain an exit pressure of 250 to 300 psig (1.83 to 2.17 MPascals). The product was a zirconia sol.

The zirconia sol prepared was tested using the Test Methods outlined above. The results are shown in Table 3 (PCS Analysis) and Table 4 (XRD Analysis and Dispersion Index).

Example 7

In a vessel, yttrium acetate hydrate (12.7 grams) was dissolved in Zirconium Acetate Solution (2000 grams) and the solution was dried. The solid (388 g) was dissolved in sufficient DI water to give a 12.5 weight percent solution (i.e., first feedstock).

The first feedstock was pumped at a rate of 80 mL/min through 100 feet (30 meters) of stainless-steel tubing that was immersed in a bath of oil heated to 206° C. The stainless-steel tubing has an outer diameter of 0.25 inch (0.64 cm) and a wall thickness of 0.035 inch (0.089 cm). Following the reactor tube, the material passed through a coil of an additional 20 feet (6 meters) of stainless-steel tubing that was immersed in an ice-water bath to cool the material. The stainless-steel tubing has an outer diameter of 0.25 inch (0.64 cm) and a wall thickness of 0.035 inch (0.089 cm). A backpressure regulator valve was used to maintain an exit pressure of 230 to 280 psig (1.69 to 2.03 MPascals). The product was a liquid suspension of fine particles of a white solid. The percent conversion of the zirconium-containing intermediate was 53%.

The liquid suspension was concentrated to 14.5 weight percent solids using a rotary evaporator. This concentrate was pumped at a rate of 15 mL/min through 100 feet (30 meters) of stainless-steel tubing that was immersed in a bath of oil heated to 206° C. The stainless-steel tubing has an outer diameter of 0.25 inch (0.64 cm) and a wall thickness of 0.035 inch (0.089 cm). Following the reactor tube, the material passed through a coil of an additional 20 feet (6 meters) of stainless-steel tubing that was immersed in an ice-water bath to cool the material. The stainless-steel tubing has an outer diameter of 0.25 inch (0.64 cm) and a wall thickness of 0.035 inch (0.089 cm). A backpressure regulator valve was used to maintain an exit pressure of 260 to 290 psig (1.89 to 2.10 MPascals). The product was a zirconia sol.

The zirconia sol was tested using the Test Methods outlined above. The results are shown in Table 3 (PCS Analysis) and Table 4 (XRD Analysis and Dispersion Index).

TABLE 3

| Example | Intensity-average Size (nm) | Volume-average Size (nm) | Intensity-average: Volume-average Ratio |
|---|---|---|---|
| 5 | 39.6 | 19.3 | 2.05 |
| 6 | 34.4 | 17.4 | 1.98 |
| 7 | 35.5 | 19.9 | 1.78 |

TABLE 4

| Example | M Intensity | M Size (nm) | C/T Intensity | C/T Size (nm) | % C/T | XRD Average Size (nm) | Dispersion Index |
|---|---|---|---|---|---|---|---|
| 5 | 9 | 6.25 | 100 | 7.5 | 92 | 7.4 | 2.6 |
| 6 | 10 | 5.5 | 100 | 7.5 | 91 | 7.3 | 2.4 |
| 7 | 49 | 8.3 | 100 | 8.5 | 67 | 8.4 | 2.4 |

Example 8

The zirconia sol prepared in Example 5 was concentrated via rotary evaporation. The concentrated sol was 36.16 weight percent inorganic oxide. A resin mixture of 50/50 ratio by weight of PEA and tribromophenoxyethylacrylate was prepared (refractive index equal to 1.5466). 1-Methoxy-2-propanol (60 grams), MEEAA (2.32 grams), beta-CEA (1.26 grams), PROSTABB 5198 (0.01 grams at 2 weight percent solids) and the resin mixture (12.46 grams) were placed in a glass vessel and the concentrated zirconia sol was added with stirring and the volatiles were removed via rotary evaporation. The resultant material was a translucent, somewhat viscous, curable (e.g., uncured) composition with 53.00 weight percent inorganic oxide. The refractive index of the uncured composition was equal to 1.6522.

A photoinitiator, LUCERIN TPO-L (0.022 grams), was added to the curable composition (5.104 grams) and mixed thoroughly. The resulting mixture was placed in a circular mold between two release liner films and then passed four times at a rate of 35 feet/min (10.5 meters/minute) through a UV processor (Fusion U.V. Systems Model MC-GRQN (Gaithersburg, Md.) equipped with an H-bulb). An optically clear disc was formed having a thickness of 1.3 millimeters. The optical clarity was high, giving a value of 0.1 using a McBeth model TD504 optical measurement device (Kollmorgen Corporation, Newburgh, N.Y.).

Example 9

The zirconia sol prepared in Example 6 was concentrated via rotary evaporation. The concentrated zirconia sol (280.12 grams, 40.05 weight percent solids, 36.02 weight percent inorganic oxide) was placed in a glass vessel and DI water (150 grams) was added with stirring. A mixture of 1-methoxy-2-propanol (456 grams), acryloxypropyl trimethoxy silane (26.26 grams) and SILQUEST A1230 (17.75 grams) were mixed with the zirconia sol. The vessel was sealed and heated to 90° C. for 4 hours. After heating, the mixture was concentrated via rotary evaporation to give 359.4 grams of surface-modified material.

Deionized water (1,287 grams) and concentrated ammonia (28.34 grams, 29 weight percent) were placed in a glass vessel and the above surface-modified material was added to this with minimal stirring. A white precipitate was obtained. The precipitate was isolated as a damp filter cake via vacuum filtration. The damp solids (336 grams) were dispersed in 1-methoxy-2-propanol (800 grams). The mixture was then concentrated (296.9 grams) via rotary evaporation. 1-Methoxy-2-propanol (200 grams) was added and the mixture was concentrated (280.7 grams) via rotary evaporation. 1-Methoxy-2-propanol was added (200 grams) and the mixture was concentrated via rotary evaporation. A translucent stable sol (258.6 grams) was isolated which contained 49.56 weight percent solids. The mixture was filtered using a 1 micrometer filter.

The filtered mixture (5.06 grams) was mixed with resin, SARTOMER SR399 (1.059 grams), and photointiator, LUCERIN TPO-L, (0.01 grams). The refractive index of the resulting composition after removal of solvent was equal to 1.616. The refractive index of the resin system alone was 1.491. The above composition was diluted with acetone to form two coating compositions. The first coating composition had 34.5 weight percent solids and the second coating solution had 67 weight percent solids. The two coating compositions were coated on 4 mil PET film using a #10 Meyer rod. The solvent was allowed to evaporate at room temperature (e.g., 20 to 25° C.) for 10 minutes. The samples were cured using a Fusion U.V. Systems Model MC-GRQN UV (Gaithersburg, Md.) processor equipped with an H-bulb in an air atmosphere (35 ft/min (10.5 meters/minute) with 1 pass). Both coating solutions resulted in hard clear coatings. The first coating was 0.25 mil (6 micrometers) thick and the second coating was 0.5 mil (12 micrometers) thick.

We claim:

1. A method of making zirconia particles, the method comprising:
   preparing a first feedstock comprising a zirconium salt;
   subjecting the first feedstock to a first hydrothermal treatment to form a zirconium-containing intermediate and a byproduct:
   forming a second feedstock by removing at least a portion of the byproduct of the first hydrothermal treatment; and
   subjecting the second feedstock to a second hydrothermal treatment to form a zirconia sol comprising zirconia particles.

2. The method of claim 1, wherein the zirconium salt has an anion comprising a carboxylate having no greater than four carbon atoms.

3. The method of claim 1, wherein the zirconium salt has an anion comprising a carboxylate comprising a first carboxylate anion having no greater than four carbon atoms and a second carboxylate anion that is a polyether carboxylate anion, wherein at least 50 mole percent of the carboxylate anions have no greater than four carbon atoms.

4. The method of claim 3, wherein the polyether carboxylate anion is 2-[2-(2-methoxyethoxy)ethoxy]acetate, 2-(2-methoxyethoxy)acetate, or a combination thereof.

5. The method of claim 2, wherein the carboxylate anion is acetate.

6. The method of claim 1, wherein the first feedstock further comprises an yttrium salt.

7. The method of claim 1, wherein preparing the first feedstock comprises preparing a precursor solution comprising a zirconium salt and removing at least a portion of an anion of the zirconium salt in the precursor solution.

8. The method of claim 7, wherein removing comprises heating the precursor solution to volatilize an acid formed from the anion of the zirconium salt.

9. The method of claim 7, wherein removing comprises at least partially drying the precursor solution to form a residue; and dispersing the residue in water.

10. The method of claim 1, wherein the zirconium-containing intermediate has a percent conversion of 40 to 75 percent.

11. The method of claim 1, wherein forming the second feedstock comprises removing an acidic byproduct formed during the first hydrothermal treatment.

12. The method of claim 11, wherein the acidic byproduct comprises a carboxylic acid having no greater than four carbon atoms.

13. The method of claim 1, wherein removing comprises at least partially drying the zirconium-containing intermediate to form an intermediate residue; and diluting the intermediate residue with water.

14. The method of claim 1, further comprising removing a liquid phase from the zirconia sol, modifying the surface of the zirconia particles, or a combination thereof.

15. Zirconia particles comprising 1 to 8 weight percent yttrium based on a weight of inorganic oxides in the zirconia particles, the zirconia particles having an average primary particle size no greater than 30 nanometers, a dispersion index of 1 to 3, a ratio of intensity-average particle size to volume-average particle size no greater than 3.0, and a crystal structure that is at least 70 percent cubic, tetragonal, or a combination thereof.

16. A zirconia sol comprising zirconia particles comprising 1 to 8 weight percent yttrium based on a weight of inorganic oxides in the zirconia particles, the zirconia particles dispersed in an aqueous medium comprising a carboxylic acid, wherein the carboxylic acid has no greater than four carbon atoms and is substantially free of a polyether carboxylic acid; and the zirconia particles have an average primary particle size no greater than 30 nanometers, a dispersion index of 1 to 5, a ratio of intensity-average particle size to volume-average particle size no greater than 3.0, and a crystal structure that is at least 50 percent cubic, tetragonal, or a combination thereof.

17. A method of making zirconia particles, the method comprising a first hydrothermal treatment and a separate second hydrothermal treatment, wherein a product of the second hydrothermal treatment prior to any additional treatment comprises a zirconia sol comprising zirconia particles dispersed in an aqueous medium comprising a carboxylic acid, wherein the carboxylic acid has no greater than four carbon atoms and is substantially free of polyether carboxylic acid; and the zirconia particles have an average particle size no greater than 30 nanometers, a dispersion index of 1 to 5, and a crystal structure that is at least 50 percent cubic, tetragonal, or a combination thereof.

18. The method of making zirconia particles of claim 17, wherein the zirconia particles comprise 0.1 to 8 weight percent yttrium based on a weight of inorganic oxides in the zirconia particles.

* * * * *

UNITED STATES PATENT AND TRADEMARK OFFICE
CERTIFICATE OF CORRECTION

PATENT NO.        : 7,241,437 B2
APPLICATION NO.   : 11/027426
DATED             : July 10, 2007
INVENTOR(S)       : Robert S. Davidson It is certified that error appears in the above-identified patent and that said Letters Patent is hereby corrected as shown below:

<u>On the Title Page Item -56- under (Other Publications)</u>
Line 6, delete "Soluitons"" and insert -- Solutions" --, therefor.

<u>On the Title Page Item -56- under (U.S. Patent Documents)</u>
Line 1, delete "2006/0017702" and insert -- 2006/0147702 --, therefor.

<u>On the Title Page Item -56- under (Other Publications)</u>
Line 1, delete "Cermaic" and insert -- Ceramic --, therefor.

<u>Col. 4</u>
Line 8, delete "last" and insert -- least --, therefor.
Line 25, delete "tail:" and insert -- tail. --, therefor.

<u>Col. 5</u>
Line 43, after "bound" delete "be" and insert -- by --, therefor.

<u>Col. 8</u>
Line 47, after "30 weight" insert -- percent --.

<u>Col. 9</u>
Line 39, after "1" delete "minutes," and insert -- minute, --, therefor.

<u>Col. 14</u>
Line 7, delete "compatabilizing" and insert -- compatibilizing --, therefor.

<u>Col. 19</u>
Line 24, delete "monoclininc" and insert -- monoclinic --, therefor.

<u>Col. 20</u>
Line 3, delete "(weight$_{dry}$" and insert -- (weight$_{dry}$) --, therefor.

UNITED STATES PATENT AND TRADEMARK OFFICE
CERTIFICATE OF CORRECTION

PATENT NO. : 7,241,437 B2
APPLICATION NO. : 11/027426
DATED : July 10, 2007
INVENTOR(S) : Robert S. Davidson It is certified that error appears in the above-identified patent and that said Letters Patent is hereby corrected as shown below:

Col. 23
Line 20, delete "mil/min" and insert -- mL/min --, therefor.

Col. 25
Line 58, delete "photointiator," and insert -- photoinitiator, --, therefor.

Col. 26
Line 14, in Claim 1, delete "byproduct:" and insert -- byproduct; --, therefor.

Signed and Sealed this

Twentieth Day of May, 2008

JON W. DUDAS
*Director of the United States Patent and Trademark Office*